UNITED STATES PATENT OFFICE.

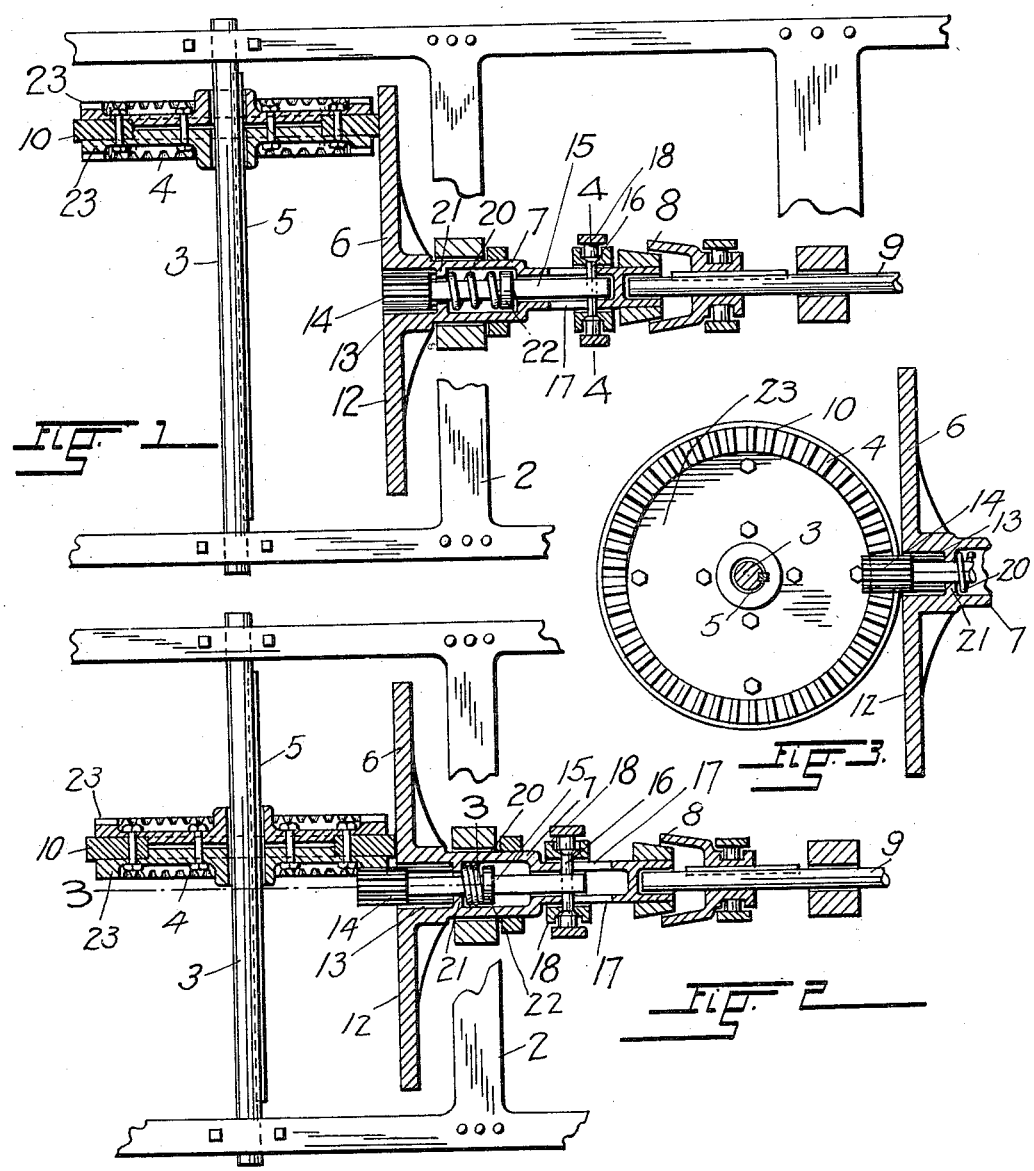

THEODORE A. SCHOMBURG, OF DENVER, COLORADO.

TRANSMISSION-GEARING.

1,127,528.    Specification of Letters Patent.    Patented Feb. 9, 1915.

Application filed April 3, 1913. Serial No. 758,633.

*To all whom it may concern:*

Be it known that I, THEODORE A. SCHOMBURG, a citizen of the United States, residing at Denver, in the county of Denver and State of Colorado, have invented certain new and useful Improvements in Transmission-Gearing, of which the following is a specification.

My invention relates to transmission gearing and its object resides in the provision of adjustable means which may be employed at the will of the operator to establish a positive connection between the driving and driven elements of a friction transmission mechanism when the said driven element is impelled at a low speed.

My invention is particularly adapted for use on a transmision gearing in which a driving element and a driven element are mounted for rotation about right-angularly disposed axes with the periphery of the driven element in frictional engagement with a face of the driving element, and in which the driven element is adjustable in the direction of its axis for the purpose of varying the velocity of its rotary movement. In friction transmission gearing of this character, it often occurs that by long usage, the peripheral surface of the driven element is flattened with the result that when upon its being moved from its neutral position in line with the axis of rotation of the driving element, to a point in the working face of the same adjacent thereto, its flattened portion is opposite to the said face, the frictional contact of the two elements is broken and the driving element will run idle without imparting its rotary motion to the driven element. It is furthermore a common occurrence, more especially when the gearing is used in connection with motor driven vehicles, that when, after the vehicle has been at rest, the driven element is moved from its neutral position, the road resistance is too great to be overcome by the frictional contact of the two elements at low speed and that in consequence the driven element will fail to rotate in unison with the driving element until it has been adjusted to a higher speed position when the vehicle is started at a rate of speed which is detrimental to its driving mechanism, and of discomfort and dangerous to its occupants.

To eliminate the above enumerated objectionable features of transmission mechanism of the type to which this invention appertains, I provide the wheel which constitutes the driven element at its opposite sides with concentric gears, and apply to the driving element a pinion which is connected to rotate in unison therewith and which normally occupies a central recess in the same so as not to obstruct the movement of the driven wheel across the center of the driving element when it is desired to reverse the motion of the shaft on which said wheel is mounted. A lever or other suitable operating contrivance is connected with the pinion to project it out of the recess into the path of the driven element for the purpose of bringing it in mesh with one or the other of the gears on the latter, and to thus effect a positive connection between the two transmission elements, when for reasons above explained, the driving element fails to impart its rotary motion to the driven wheel.

An embodiment of my invention has been illustrated in the accompanying drawings in the various views of which like parts are similarly designated, and in which, Figure 1, represents a sectional elevation of the mechanism with the pinion in the retracted position. Fig. 2, a similar view showing the parts in the position in which the transmission elements are positively connected by the engagement of the pinion on the driving element with one of the gears on the driven wheel. Fig. 3, a fragmentary section taken along the line 3—3, Fig. 2, and, Fig. 4, a transverse section taken along the line 4—4, Fig. 1.

Referring more specifically to the drawings, the numeral 2 designates a suitable support for the rotary shafts of the transmission mechanism, such as the chassis of an automobile, 3 the driven shaft upon which the friction wheel 4 is longitudinally, slidably mounted by means of a feather 5, and 6 the driving disk which in the construction shown is formed at the end of a hollow shaft 7 which by means of a clutch 8 is operatively associated with the motor shaft 9.

The driven wheel 4 consists as usual, of two sections which are bolted together to secure the interposed, annular tire 10 of compressed paper, rubber, leather or other suitable friction-inducing material, whose peripheral surface is continuously in engagement with the working face 12 of the disk 6, and the said wheel is furthermore provided at its opposite sides with concentric gears 23 which are preferably formed integral with the sections of which it is composed.

An axial recess 13 in the face of the disk connects with the interior of the hollow shaft to receive the pinion 14 which is secured at the end of a shaft 15 of angular cross-section which is slidably fitted in a correspondingly formed portion of the shaft 7, and the said recess is provided interiorly with teeth which mesh with those of the pinion to effect a continuous positive connection between the latter and the disk.

The pinion shaft 15 is by means of a transverse pin 16 which projects through longitudinal slots 17 in the shaft of the disk, connected with a surrounding sleeve 18 which is peripherally grooved to receive trunnions formed at the bifurcated extremity of the operating lever 19 shown in Fig. 4, and a spring 20 disposed in the hollow shaft between an annular shoulder 21 formed within the same and a collar 22 on the pinion shaft is provided to normally maintain the pinion in its retracted position within the recess 13.

When it is desired to establish a positive connection between the transmission elements 4 and 6 the pinion is by means of the lever 19, partially projected out of the recess after the driven wheel has been moved from its neutral position in alinement with the axis of the driving disk, and the said wheel is subsequently moved toward the pinion to bring the adjacent gear 23 in operative engagement therewith.

When after the driving wheel has been moved to a higher speed position the lever 19 is released, the spring 20 will automatically return the pinion to its normal position within the recess.

While I have shown and described my improved transmission gearing in the best form at present known to me, I desire it understood that several variations in the construction and arrangement of the parts comprised therein, may be resorted to without departing from the principle of the invention. It may, for instance, be found unnecessary to employ a clutch connection between the shafts of the driving disk and the motor, in which case the said shafts are operatively associated in the usual manner, and while it is preferable to so arrange the parts that the pinion is normally disposed within the recess, it may be found of advantage to vary the construction so that the pinion extends normally in the path of the driven wheel and is retracted only when it is desired to move the said wheel past the center of the driving disk for the purpose of reversing its movement.

The means used for adjusting the position of the pinion may consist of an independent hand or foot lever placed within reach of the driver of the vehicle to which the mechanism is applied or it may be operatively associated with the lever system used to change the position of the driven wheel with relation to the center of the driving disk.

Having thus described my invention what I claim and desire to secure by Letters Patent is:—

1. In a transmission gearing, a rotary element, an adjustable, rotary element in frictional engagement therewith, and transmission members connected with said elements for the transmission of the movement of the one to the other independent of their said frictional engagement, one of said members being adjustable to prevent its coöperative engagement with the other.

2. In a transmission gearing, a rotary driving element, an adjustable, rotary driven element in frictional engagement therewith, a gear on said driven element, a pinion adjustably mounted for rotation with the driving element and adapted to be operatively engaged by the said gear at a determinate point in the adjustment of the driven element, and means for adjusting said pinion whereby to move it out of the path of the said gear.

3. In a transmission gearing, a disk and a wheel mounted for rotation about right-angularly disposed axes, the said wheel being adjustable in the direction of its axis and frictionally engaging, at its periphery, a face of the said disk, a concentric gear on said wheel, a pinion adjustably mounted to rotate in unison with said disk and to be operatively engaged by said gear at a determinate point in the adjustment of said wheel, and means for adjusting said pinion whereby to move it out of the path of the gear.

4. In a transmission gearing, a driving disk and a driven wheel mounted for rotation about right-angularly disposed axes, the said wheel being adjustable in the direction of its axis and frictionally engaging at its periphery, a face of the said disk, and the disk having in the said face an axial recess, a gear on said wheel, a pinion mounted to rotate in unison with said disk and to be operatively engaged by said gear at a determinate point in the adjustment of the wheel, and means for moving said pinion into the said recess out of the path of said gear.

5. In a transmission gearing, a driving disk and a driven wheel mounted for rotation about right-angularly disposed axes, the said wheel being adjustable in the direction of its axis and frictionally engaging at its periphery, a face of the said disk, and the disk having in the said face an axial recess, a gear on said wheel, a pinion adapted to occupy said recess, and means for moving said pinion out of the recess for its operative engagement with the said gear.

6. In a transmission gearing, a driving disk and a driven wheel mounted for rotation about right-angularly disposed axes, the said wheel being adjustable in the direction of its axis and frictionally engaging at its periphery, a face of the said disk, and the disk having in the said face an axial recess, a gear on said wheel, a pinion adapted to occupy said recess, means for moving said pinion out of the recess for its operative engagement with the said gear, and a spring disposed to automatically return the pinion to its position within the recess.

7. In a transmission gearing, a disk and a wheel mounted for rotation about right-angularly disposed axes, the said wheel being adjustable in the direction of its axis and frictionally engaging at its periphery, a face of the said disk, concentric gears at opposite sides of said wheel, and a pinion mounted for rotation with the said disk to be operatively engaged by either one of said gears, said pinion being capable of adjustment to move it out of the path of said gears.

8. In a transmission gearing, a disk and a wheel mounted for rotation about right-angularly disposed axes, the said wheel being adjustable in the direction of its axis, and frictionally engaging at its periphery, a face of the said disk, a concentric gear on said wheel, and a pinion mounted for rotation with the said disk to be operatively engaged by said gear, said pinion being capable of adjustment to move it out of the path of said gear.

In testimony whereof I have affixed my signature in presence of two witnesses.

THEODORE A. SCHOMBURG.

Witnesses:
G. J. ROLLANDET,
L. RHOADES.

Copies of this patent may be obtained for five cents each, by addressing the "Commissioner of Patents, Washington, D. C."